(12) United States Patent
Sajassi et al.

(10) Patent No.: US 7,975,180 B2
(45) Date of Patent: *Jul. 5, 2011

(54) METHOD AND APPARATUS FOR FAULT DETECTION/ISOLATION IN METRO ETHERNET SERVICE (75) Inventors: Ali Sajassi, Concord, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/655,108

(22) Filed: Dec. 23, 2009

(65) Prior Publication Data

US 2010/0146324 A1 Jun. 10, 2010

Related U.S. Application Data

(63) Continuation of application No. 10/858,810, filed on Jun. 2, 2004, now Pat. No. 7,644,317.

(51) Int. Cl.
*G06F 11/00* (2006.01)

(52) U.S. Cl. .......................................................... 714/43

(58) Field of Classification Search ..................... 714/43, 714/39
See application file for complete search history.

(56) References Cited

U.S. PATENT DOCUMENTS

| | | | |
|---|---|---|---|
| 7,380,154 B2 * | 5/2008 | Gale et al. ........................ 714/4 |
| 7,644,317 B1 * | 1/2010 | Sajassi et al. ................... 714/43 |
| 7,835,265 B2 * | 11/2010 | Wang et al. ..................... 370/216 |
| 2003/0067871 A1 * | 4/2003 | Busi et al. ...................... 370/222 |

* cited by examiner

*Primary Examiner* — Scott T Baderman
*Assistant Examiner* — Yair Leibovich
(74) *Attorney, Agent, or Firm* — The Law Offices of Bradley J. Bereznak (57) ABSTRACT

Apparatus and method of detecting a fault in a network service includes an Ethernet access network domain in which a heartbeat message is broadcast at a periodic interval by each of a plurality of edge devices associated with an instance of the network service. Each of the edge devices also receives the heartbeat messages broadcast at the periodic interval from other edge devices. A fault occurrence is identified when the edge device fails to receive an expected heartbeat message at the periodic interval from one of the other edge devices.

8 Claims, 5 Drawing Sheets

| Service Instance ID | MAC Address | Ingress | Egress |
|---|---|---|---|
|  |  |  |  |
|  |  |  |  |
| ⋮ | ⋮ | ⋮ | ⋮ |
|  |  |  |  |

FIG. 5

(A) $CE_{63}$ -- $uPE_{61}$ -- $B_{65}$ -- $B_{66}$ -- $nPE_{43}$ -- P -- P -- $nPE_{41}$ -- P -- $uPE_{51}$ -- $CE_{52}$ (B) E ---- E ---- E ---- E ---- E ---------- E --------- E ----- E (C) MP ---- IP ---------------------------------------- IP ---- MP (D) MP ------------- IP ---------- IP -------- MP
                                   Provider Domain (E) MP ---- IP ---- IP ---- MP ---------- MP ------- MP
        Operator        Operator     Operator
        Domain         Domain       Domain (F) MP ---- IP -- IP -- MP ---- IP -- MP
                  MPLS        MPLS
                Domain     Domain

FIG. 6

METHOD AND APPARATUS FOR FAULT DETECTION/ISOLATION IN METRO ETHERNET SERVICE

This application is a continuation of application Ser. No. 10/858,810, filed Jun. 2, 2004, now U.S. Pat. No. 7,644,317 entitled, "Method and Apparatus for Fault Detection/Isolation in Metro Ethernet Service", which is assigned to the assignee of the present application.

FIELD OF THE INVENTION

The present invention relates generally to the fields of digital communications systems and distributed computing. More specifically, the present invention relates to fault management (FM) for distributed computing systems and networks.

BACKGROUND OF THE INVENTION

Fault detection deals with mechanisms that can detect both hard failures, such as link and node failures, and soft failures, such as software failures, memory corruption, mis-configuration, etc. Typically, a lightweight protocol is desirable to detect the fault and to verify the fault along the data path before taking steps to isolate the fault to a given node or link (e.g., diagnose the fault). Therefore, a fault isolation mechanism is also needed for fault management.

The problem of detecting hardware and software failures in a multipoint communications network, or in a distributed computing system, is very difficult to solve. By way of background, failure mechanisms for various network topologies and a proposed solution for a communications network are described in U.S. Pat. No. 6,732,189 entitled "Method and Apparatus for Fault Tolerant Tunneling of Multicast Datagrams". U.S. Pat. No. 6,668,282 entitled "System and Method to Monitor and Determine if an Active IPSec Tunnel Has Become Disabled" teaches a technique for determining when communications through an Internet Protocol Security (IPSec) tunnel has failed, and steps for isolating the problem so it can be resolved.

Fault detection schemes for traditional wide area networks (WANs) such as Frame Relay (FR) and asynchronous transfer mode (ATM) networks are known in the prior art. For example, ATM networks commonly utilize a standard continuity check mechanism to detect hardware failures in the communications network with point-to-point connectivity. More difficult is the problem of resolving hardware and software failures in a multipoint communication network that allows each customer edge (CE) device or node to communicate directly and independently with all other CE devices in the same service instance via a single Attachment Circuit (AC) to the network. In a multipoint network, there are many paths that packet data units (PDUs) can travel.

Ethernet is a Media Access Control (MAC) layer network communications protocol specified by the Institute of Electrical and Electronics Engineers (IEEE) in IEEE specification 802.3 (the "802.3 specification"). Ethernet switched campus networks are an example of a multipoint service architecture. In the past Ethernet has been widely deployed in Local Area Networks (LANs). Today, Ethernet is migrating from LANs to metropolitan-area networks (MANs) and is becoming increasingly attractive to metro service providers (MSPs) because of its simplicity, flexibility, low cost, and quick time to service. From the standpoint of fault management, however, an Ethernet network poses an especially difficult problem because the MAC addresses that indicate the path that data packets travel gets "aged out" after a predetermined time interval (e.g., five minutes). In other words, the very information that is most useful for isolating faults in a multipoint network is transient by nature of the Ethernet protocol. Further complicating the problem is the fact that Ethernet services can be offered over a variety of transport mechanisms such as Ethernet PHY (802.3), SONET, ATM, FR, and multi-protocol label switching (MPLS)/Internet Protocol (IP)—e.g., an end-to-end Ethernet service for a customer can be offered over an Ethernet access network (an 802.1ad provider bridge network) on one side and a MPLS/IP access network on the other side.

Despite the problems inherent in providing a fault management mechanism (including fault detection) in carrier-class Ethernet services, MSPs still demand that Ethernet Virtual Connections (EVCs)—either point-to-point or multipoint—be protected by the same degree of fault management as existing ATM or FR virtual connections. Therefore, it is important to be able to detect and accurately isolate faults for any given Ethernet VC (or Service Instance) over any given transport type. Unfortunately, there are no existing solutions to the problem of fault management for Metro Ethernet (multi-point) services.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A method and apparatus for both detecting and isolating hard and soft failures in Ethernet networks and services is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor, a main memory and an input/output (I/O) subsystem. Data is transferred between the main memory ("system memory") and processor subsystem over a memory bus, and between the processor and I/O subsystems over a system bus. Examples of the system bus may include the conventional lightning data transport (or hyper transport) bus and the conventional peripheral component [computer] interconnect (PCI) bus. The processor subsystem may comprise a single-chip processor and system controller device that incorporates a set of functions including a system memory controller, support for one or more system buses and direct memory access (DMA) engines. In general, the single-chip device is designed for general-purpose use and is not heavily optimized for networking applications. Additional memory devices, such as VRAM, flash memory, etc., may also be included in each node.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

Virtual Private Network (VPN) services provide secure network connections between different locations. A company, for example, can use a VPN to provide secure connections between geographically dispersed sites that need to access the corporate network. A Virtual Private LAN service (VPLS) is a bridged LAN service provided to a set of CEs that are members of a VPN. In a VPLS, the CEs that are members of the same VPN (e.g., the same VPLS service instance) communicate with each other as if they are connected via a bridged LAN. VPLS architecture thus delivers Layer 2 service that in all respects emulates an Ethernet LAN across a Wide Area Network (WAN) and inherits the scaling characteristics of a LAN.

The bridged LAN functionality of a VPLS is emulated by a network of Provider Edge (PE) devices or Provider Bridges (PB) to which the CEs are connected. This network of PEs (or PBs) can belong to a single network operator or can span across multiple network operators. A service provider (SP) is the entity responsible for providing Ethernet/VPLS service to its customers; whereas a network operator (or facility provider) provides the necessary facilities to the SP(s) in support of their services. A network provider and a service provider can be the same entity or they can be associated with different administrative organizations.

Figure 1:
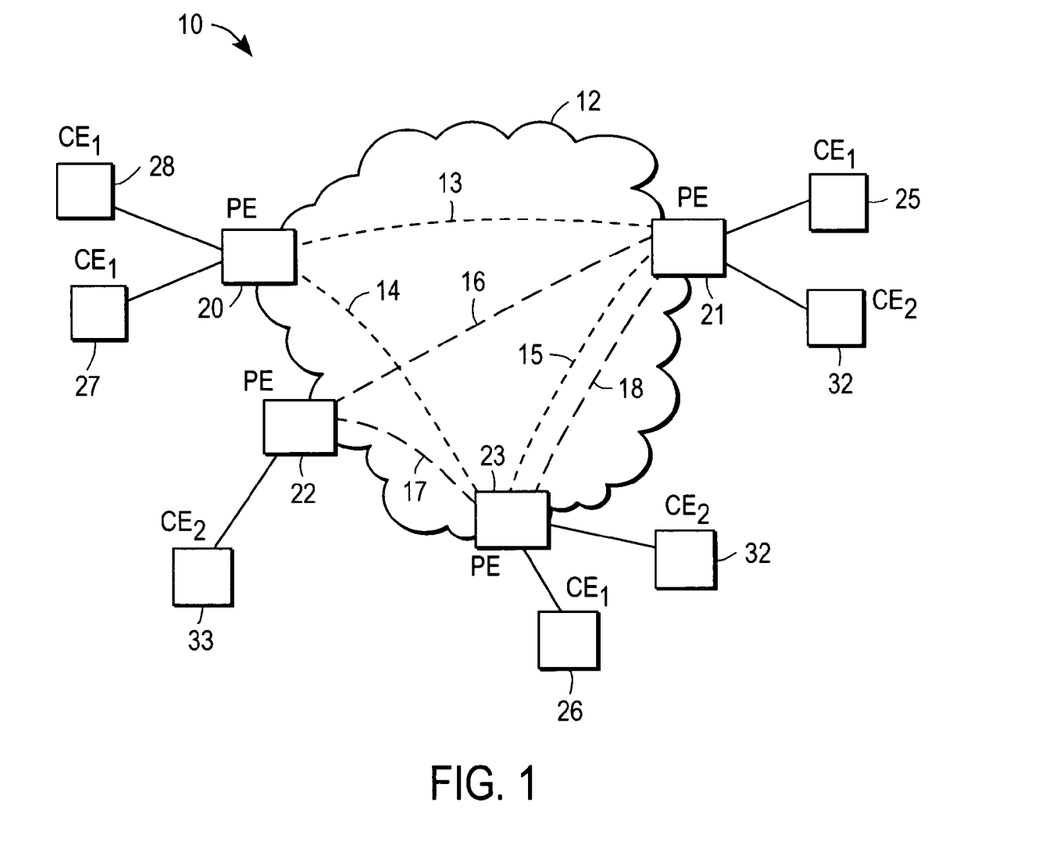
FIG. 1 is an example an exemplary VPLS system or a Metro Ethernet network.

FIG. 1 shows an example of a VPLS system 10 in which the CE devices are connected to the service provider network through an associated PE device. For example, CE devices 27 & 28 are connected to PE device 20; CE device 33 is connected to PE device 22; CE devices 26 & 32 are connected to PE device 23; and CE devices 25 & 31 are connected to PE device 21. The subscript "1" of CE devices 25-28 identifies a first service instance, and the subscript "2" of CE devices 31-33 identifies a second service instance that is separate from the first service instance. In the example of FIG. 1, each PE includes a Virtual Switch Instance (VSI) per service instance that emulates an Ethernet bridge (i.e., switch) function in terms of MAC address learning and forwarding in order to facilitate the provision of a multi-point VPN.

The four PE devices 20-23 act as a gateway between the Service Provider (SP) network 12 (e.g., MPLS/IP) and the customer domain. Pseudowires (PWs) 13-15 are shown connecting the VSIs of PEs 20, 21 & 23 so as to provide a full mesh of connections associated with the first service instance. Similarly, PWs 15-18 connect the VSIs of PEs 21-23 associated with the second service instance. A PW is a virtual connection that is bi-directional in nature and, in this example, may consist of a pair of unidirectional MPLS Virtual Circuits (VCs).

In accordance with the present invention, each maintenance end point (in this example, a PE edge device) broadcasts a message (referred to as a continuity check (CC) or heartbeat (HB) message) to the other edge PEs associated with a particular service instance at regular, periodic intervals. Accordingly, each edge device also receives the HB messages sent by the other edge PEs associated with that service instance. In the example of FIG. 1, for instance, PE device 20 sends/receives HB messages associated with the first service instance, PE device 22 sends/receives HB messages associated with the second service instance, and PE devices 21 and 23 send/receive two separate HB messages associated with the first and second service instances, respectively. In the event that a PE device stops receiving the periodic heartbeats from a remote PE device, it concludes that either the remote PE device (i.e., node) has failed or an unrecoverable failure occurred in the data path connection. In response, the failure detecting PE device may notify the operator of the failure. Failure verification and isolation procedures may then be initiated, either automatically (e.g., by firmware instructions) or through operator command. Failure verification can be performed through a simple command/response type message (e.g., ping or loopback message) between the source PE device and the target PE device. If the target PE device does not respond to the loopback message, then a Fault Isolation procedure, as described later, can be exercised.

Figure 5:
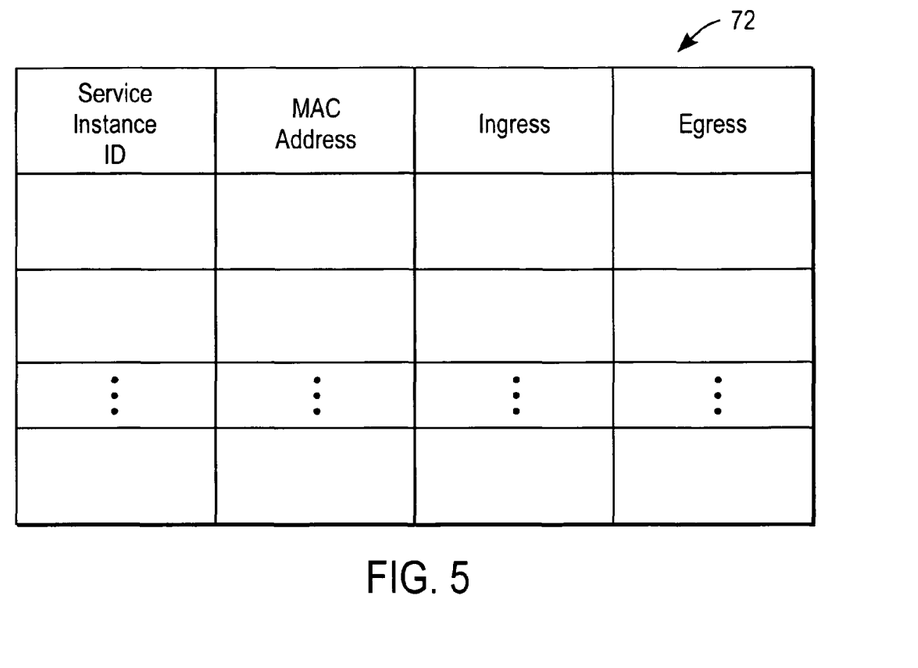
FIG. 5 is a table utilized in accordance with one embodiment of the present invention.

Upon receiving the HB messages, the receiving Maintenance End Point (e.g., edge PE) compiles the received information in a catalogue table (typically a location in RAM) that is indexed by the MEP identification (ID). An example of such a catalogue table 72 is shown in FIG. 5, wherein the MEP ID can be the MAC address of the originating PE device. Also included in table 72 is the service instance ID associated with the HB message as well as the ingress/egress port/interface information to/from adjacent nodes in the data path. Table 72 may include other information useful to the detection, verification and isolation of a fault.

Note that each remote MEP of a given service instance is represented by an entry in catalogue table 72. Entries are initially created upon receiving the first HB message from the corresponding MEP or via configuration. In one implementation, a validity timer of 2.5 transmission intervals is maintained for each table entry. If the timer expires, then a fault for that remote maintenance end point is detected and subsequent fault verification and isolation procedures may be exercised.

It is also appreciated that table 72 may be updated dynamically in accordance with each new HB message received. By way of example, in the event that a particular network segment becomes unreachable, the Spanning Tree Protocol (STP) algorithm running on the Ethernet network may reconfigure the data path tree topology and re-establish the link by activating an appropriate standby path. In such a case, the ingress/egress port information associated with a particular node in the data path will change upon receiving the next HB message to reflect re-routing by the STP algorithm.

After a failure, the information stored in the catalogue table is not lost, as is normally the case with MAC addresses associated with an ordinary Ethernet VC. In other words, the catalogue table information does not get "aged-out" as is the case with the MAC Filtering Database (L2 forwarding table). Rather, each transient point (e.g., PE or Provider Bridge node) snoops the received HB message and stores the source MAC address along with the interface (i.e., ingress/egress) address information into a table in memory that is separate from the MAC Filtering Database. The information in the catalogue table may be used later during the fault isolation process, which aspect of the invention is described in more detail below.

Figure 2:
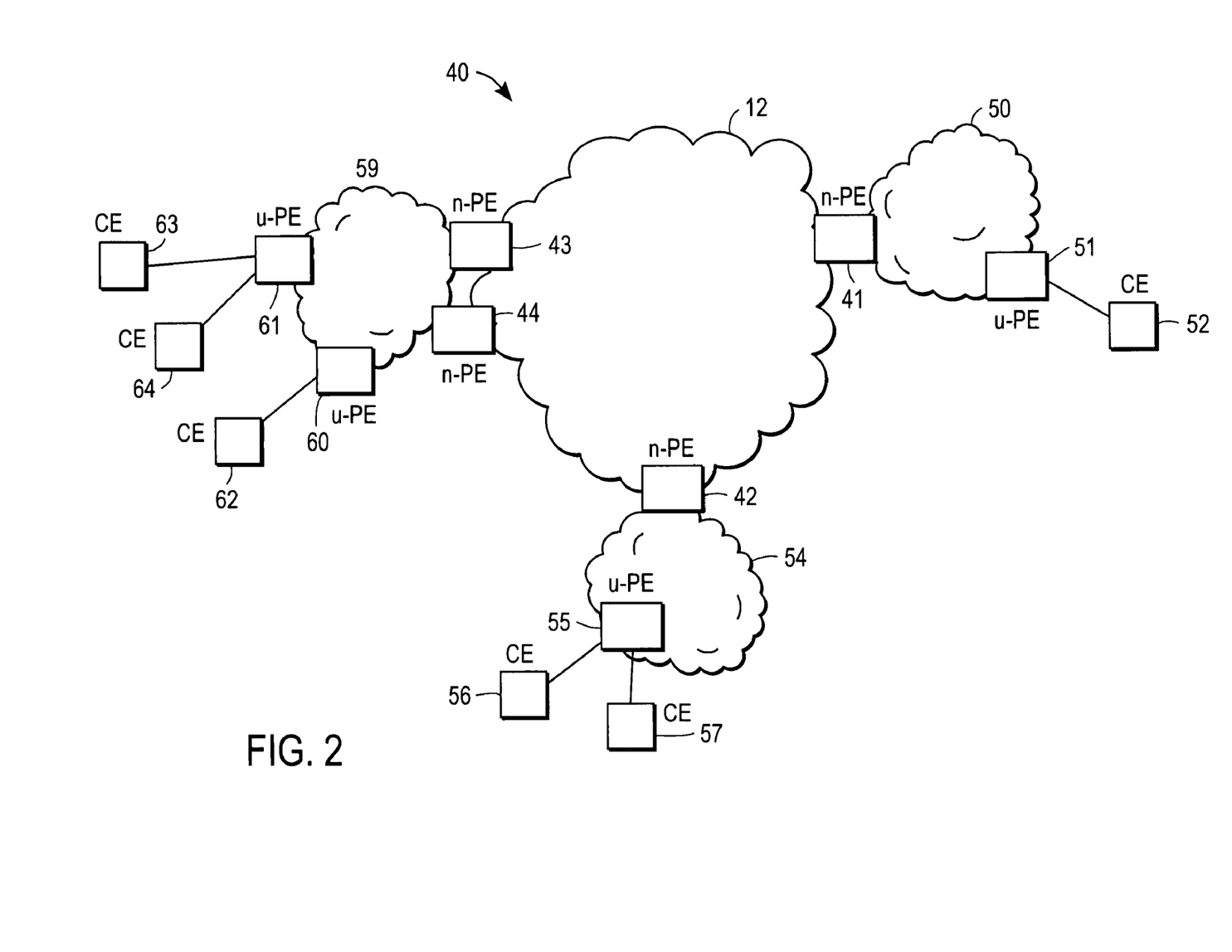
FIG. 2 illustrates a VPLS system with a MPLS/IP core network and separate access networks in accordance with one embodiment of the present invention.

It should be understood that the fault management mechanism of the present invention is applicable to cases in which the end-to-end service spans across different types of VPLS networks. For example, FIG. 2 illustrates a VPLS 40 with separate access network domains 50, 54 and 59. In this embodiment, access network 59 is a bridged network (e.g., IEEE 802.1ad); whereas access networks 50 & 54 may be MPLS and the core network 12 connecting them may be IP, MPLS, ATM, SONET, etc. Each network may be associated with a separate administrative domain and also multiple such networks may be associated with a single administrative domain. Different types of PWs (not shown) may be in use to support the end-to-end VPLS. In each case, the method and apparatus of the present invention operates independent of the underlying transport mechanism.

As shown in FIG. 2, bridged access network 59 includes user-facing provider edge (u-PE) devices 60 and 61 connected to respective customer edge (CE) devices 63 & 64 and 62. Access network 59 is connected to SP core 12 via network-facing provider edge (n-PE) devices 43 & 44. Likewise, access networks 50 and 54 are respectively connected to core 12 through n-PE devices 41 and 42. CE device 52 is connected to the service through u-PE device 51, and CE devices 56 & 57 are connected to the service through u-PE 55.

Figure 3:
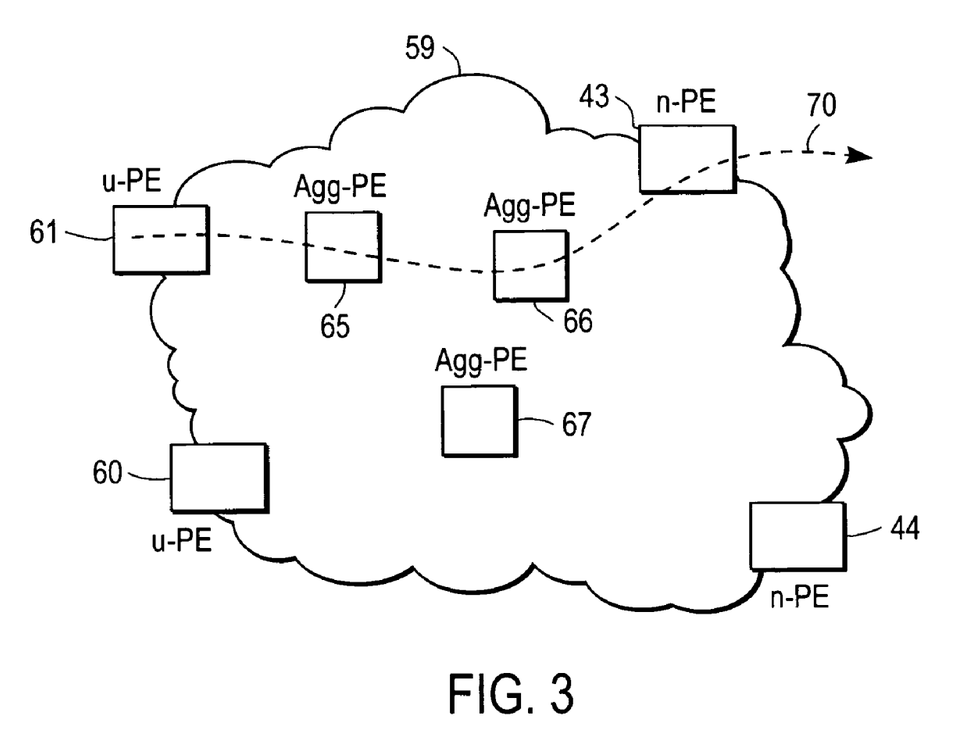
FIG. 3 is an expanded view of one of the access networks of the VPLS system shown in FIG. 2.

By way of further example, FIG. 3 shows a data path 70 that traverses u-PE device 61, aggregation (Agg-PE) devices 65 & 66, and n-PE device 43 for a particular service instance. Each of Agg-PE devices 65-67 is an Ethernet switch that functions to aggregates one or more u-PE devices for onward connection to one or more n-PE devices. (In the context of the present application, the terms "bridge" and "switch" are considered synonymous.) In this example, Agg-PE device 67 and n-PE device 44 are designated as standby devices according to the STP protocol. These standby devices may be activated by the STP protocol to establish a redundant data path in the event of a node or link failure in existing data path 70. Recall that fault detection and isolation occurs on a per service instance (i.e., per VPLS) when there is a discontinuity or disruption in the network service, i.e., no alternative or redundant paths are available.

Figure 6:
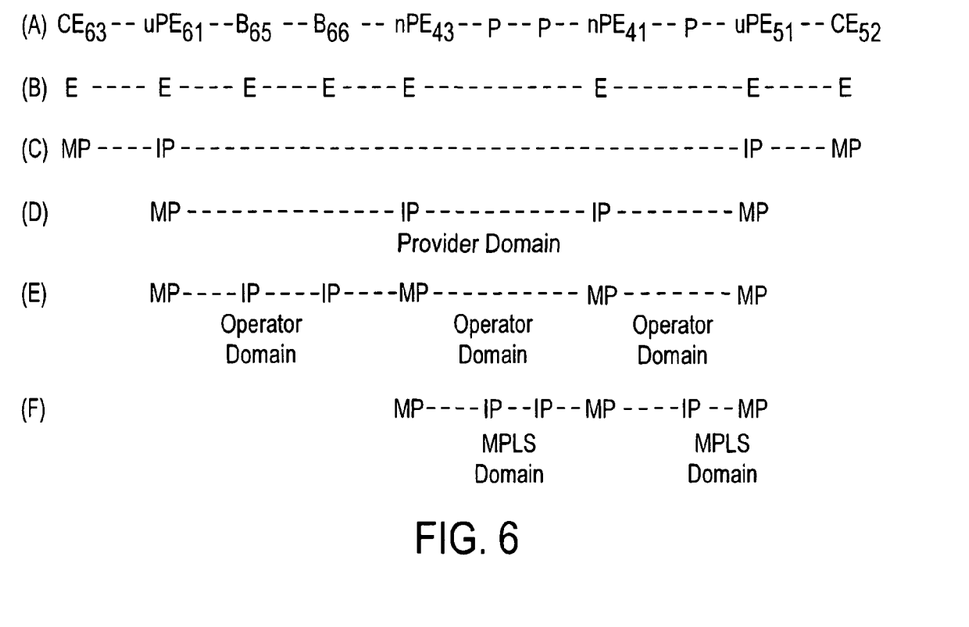
FIGS. 6A-E show a hierarchical diagram illustrating Maintenance End Points (MEPs) and Maintenance Intermediate Points (MIPs) associated with various domains of an exemplary VPLS system.

With continued reference to FIGS. 2 & 3, consider an example of end-to-end VPLS service provided between CE devices 52 & 63, located at different sites. For this example, FIG. 6A shows the VPLS service spanning across networks 59, 12, and 50, as marked by the various u-PE and n-PE devices. (Subscripted numerals in FIG. 6 correspond to the reference numerals in FIGS. 2 & 3. Bridge component devices 65-67 are marked "B" and the MPLS access network 50 and core network 12 are represented by components marked "P".) FIG. 6B shows the service/network view at the Ethernet MAC layer, marked by "E". Note that only nodes with Ethernet functionality are visible to fault management mechanisms operating at the Ethernet MAC layer. In other words, at this level the provider (i.e., "P") nodes are invisible. FIG. 6C represents the maintenance points and intermediate points that are visible within the customer domain. In yet another hierarchical layer, FIG. 6D represents the maintenance points and intermediate points that are visible within the service provider domain. Finally, FIG. 6E represents the maintenance points and intermediate points that are visible within each operator domain.

According to the present invention, fault detection is accomplished in this example by means of HB messaging from u-PE device 61 to u-PE device 51, and from u-PE device 51 to u-PE device 61. In other words, each of the u-PE devices 51 & 61 comprise maintenance end points that are responsible for origination and termination of periodic HB messages for that service instance. It is appreciated that these maintenance end points are located at the edge of their corresponding domains (i.e., domains 59 & 50). The HB messages use a multicast address that traverses through the data-plane (for data-plane integrity check).

Additionally, the HB messages can be snooped by the control plane (e.g., by the device's processor) of the Maintenance Intermediate Points (e.g., Agg-PEs & n-PEs) for building catalogue tables not impacted by the age-out feature of the conventional MAC Filtering Database. In the embodiment of FIG. 3, for example, Agg-PE devices 65 & 66 and n-PE device 43 comprise maintenance intermediate nodes or points, each of which builds their own separate catalogue tables in response to the traversing HB messages. That is, intermediate nodes in the domain do not initiate or terminate HB messages; rather, they snoop the HB messages for information utilized in the building of their respective catalogue tables. (It should be further understood that the HB messages do not require a response.)

Practitioners in the art will appreciate that maintenance end and intermediate points correspond to a PE device, or to an interface of a PE device. For example, a HB message may be considered to originate from the u-PE processor or from an ingress interface of a u-PE device.

In an alternative embodiment, the concept of a network domain may be embedded in a field of the multicast MAC address of the HB messages. The domain field may be used to enable only the intermediate nodes that are part of the same domain to snoop and process the HB messages. The other intermediate nodes that are not part of the domain either pass or block the HB messages transparently depending on the domain hierarchy. In the embodiment of FIGS. 2 & 3, for example, the domain might only extend to the devices in the network domain 59 so that HB messages are cataloged by devices 61, 65, 66, and 70 within domain 59, but those same messages do not pass through the n-PE devices (and Agg-PE devices) of network domains 12 and 50.

In a domain hierarchy, each domain has its own set of Maintenance End Points (MEPs) and Maintenance Intermediate Points (MIPs). A MEP shall block (filter) fault management messages from a lower-level domain to enter its domain or conversely to let these messages to leak from its domain into a higher-level domain. Since domains are hierarchical as described above, the maintenance end and intermediate points that are associated with the domains become hierarchical as well. A MEP of a higher-level domain is always a MEP of a lower-level domain but the converse is not always true since the MEP of lower-level domain can either be MIP or a MEP of a higher-level domain. Furthermore, the MIPs of a lower-level domain are always transparent to the higher-level domain (e.g., OAM/FM messages of a higher-level domain are not seen by MIPs of a lower-level domain and get passed through them transparently).

By way of example, FIGS. 6C-E illustrate three hierarchical domains for the VPLS shown in FIGS. 2 & 3: a customer domain which is among the CE devices (e.g., CE devices 52 & 63 serve as MEPs and the adjacent u-PE devices 51 & 61 serve as MIPs for that domain) of a given customer for that service instance; a service provider domain which is among the edge PE devices (e.g., u-PE devices 51 & 61 serve as MEPs and n-PE devices 41 & 43 serve as MIPs for that domain) of the given service provider; and a network operator domain, which is among the PE devices of a given operator. In the example of FIG. 2, the three operator domains correspond to network domains 50, 12, and 59. The operator domain 59 has u-PE 61 and n-PE 43 as its MEPs and bridges 65 & 66 as its MIPs. Whereas, the operator domain 12 and 50 have only MEPs (and no MIPs) since there are no Ethernet bridging devices serving as intermediate points in those two domains.

Figure 4:
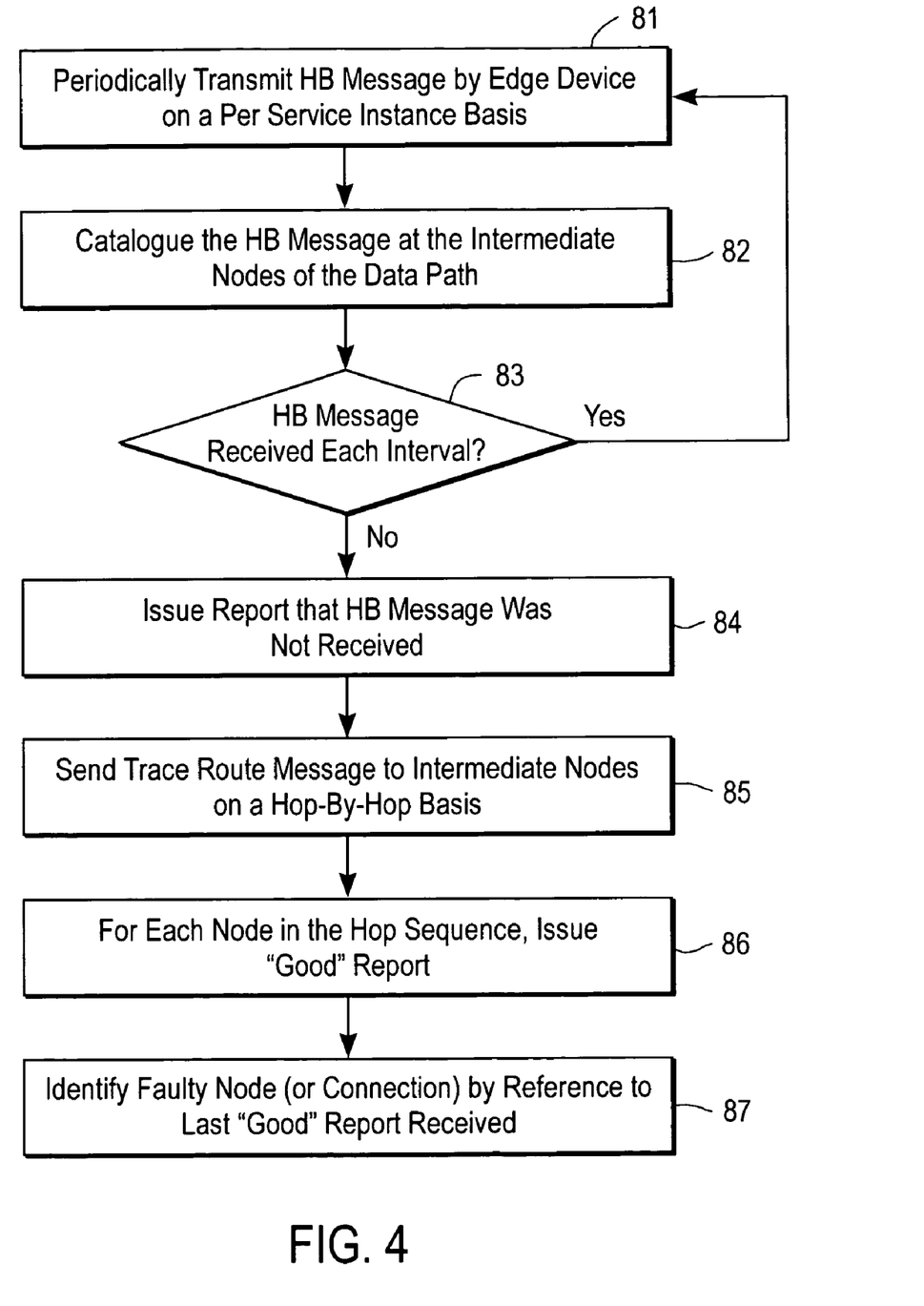
FIG. 4 is a flowchart illustrating a method of operation according to one embodiment of the present invention.

FIG. 4 is a flowchart showing the processes of fault detection and fault isolation according to one embodiment of the present invention. Block 81 shows the step wherein each edge device periodically transmits a HB message on a per service instance-basis. As the HB message traverses the intermediate nodes, each intermediate node of the data path (identified in the embedded domain field, if this option is employed) catalogues the HB messages (block 82). As long as there is no discontinuity or disruption of the service, periodic messaging continues among the maintenance end points (block 83). As explained previously, when a HB message is not received (when it is expected, or within a predetermined time interval thereafter), a fault is detected and a report is issued by the detecting edge device (block 84). At this stage, fault verification and fault isolation may commence, either automatically (under programmed control) or by a network operator.

According to one embodiment of the present invention faults associated with a given VPLS service instance are isolated utilizing a TraceRoute message or function. The TraceRoute message is a multicast message that is transmitted to all adjacent intermediate nodes on a hop-by-hop basis (see block 85 in FIG. 4). The TraceRoute message is initiated by a maintenance end point either automatically (e.g., by firmware instructions) or by operator command. Each maintenance intermediate point in the data path intercepts the TraceRoute message and forwards it onto the next hop after processing the message. Specifically, the intercepting node accesses the service instance information stored in the node's MAC filtering database and if the information is not available, then it accesses the catalogue table to determine the egress interface address information (i.e., output interface) that indicates where the TraceRoute message is to be sent next in the data path. The node then transmits the TraceRoute message to the next node (i.e., next hop) in the data path. If a node does not have a catalogue table or entries in its table associated with that service instance, it simply ignores the message.

Each intermediate node also sends a response back to the originating maintenance point acknowledging that it was received and to report that a valid or "good" connection is established through that node. This step is shown occurring in block 86 of FIG. 4. The fault is isolated when a "good" report is not generated by the last intermediate or end point in the data path, or, alternatively, is not received by the source maintenance point. In other words, the fault is isolated at the node in the data path after the last "good" report issued by the penultimate node. This step is shown occurring in FIG. 4 at block 87.

It should be noted that in the above-described embodiment the source maintenance end point sends a single TraceRoute message to the next hop along the trace data path; however, it may receive many responses from different intermediate points along the trace path as a result of the message traversing hop-by-hop.

The concept of a domain ID may also be incorporated into the TraceRoute message (in addition to the HB message) to limit the scope or extent of these messages. In other words, a domain ID field in the TraceRoute message can be used to limit the extent over which the message may operate, not only on a per service instance basis, but also on a per network or localized basis.

Practitioners will appreciate that a variety of alternative implementations and embodiments may be realized in accordance with the present invention. For example, the TraceRoute message may be issued immediately (within a few minutes) following fault detection such that it gets exercised within the age-out window of MAC addresses in the Filtering database. That is, the TraceRoute message may traverse the data path by accessing the MAC address Filtering database, so long as the information in that database has not yet been aged out, i.e., erased. Another possibility is to maintain information about the destination maintenance end point at the intermediate points along the data path. This approach can be facilitated by the HB messages. In yet another implementation, visibility of the data path can be maintained at the source maintenance end point through the issuance of periodic TraceRoute messages prior to the occurrence or detection of a fault.

It should also be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. For instance, in yet another alternative embodiment, the TraceRoute message may include an additional field to indicate which intermediate node should respond (e.g., only nodes having a hop count of three or more should report or respond). This approach may be useful to more quickly isolate the fault location. It should also be understood that the Ethernet fault management scheme described above is not limited to VPLS system and can be applied to any general Ethernet bridged networks (e.g., a network that consists of bridge nodes—regardless whether the bridge nodes are u-PE/n-PE or PB). Accordingly, the specification and drawings are to be regarded in an illustrative rather than a restrictive sense.

We claim:

1. A method of detecting and isolating a fault of a Virtual Private Local Area Network service (VPLS) that provides Ethernet-based multipoint to multipoint communication, comprising:

broadcasting heartbeat (HB) messages by a maintenance end point (MEP) device associated with a service instance of the VPLS, the HB messages being broadcast at a periodic interval to a plurality of remote MEPs associated with the service instance, the HB messages being snooped by each of one or more maintenance intermediate point (MIP) devices, MAC address information contained in HB messages being catalogued by the MIP devices in a table that is separate from a transient filtering database, the MAC address information identifying a data path through the one or more MIP devices;

receiving, by the MEP device, periodic HB messages broadcast at intervals from the remote MEP devices;

identifying a fault occurrence when the MEP device fails to receive a periodic HB message at one of the intervals from one of the remote MEP devices;

initiating, by the MEP device, a fault isolation procedure in response to the fault occurrence.

2. The method of claim 1 further comprising reporting the fault occurrence to an operator.

3. The method of claim 1 wherein the fault isolation procedure comprises transmitting a trace multicast message, the trace multicast message being intercepted by each of the one or more MIP devices in the data path, each MIP device in the data path processing the trace message to access the MAC address information stored either in the transient filtering database or the table to determine egress address information that indicates a next MIP device in the data path where the trace multicast message is to be sent, the trace message thereinafter being transmitted to the next MIP device, each of the one or more MIP devices in the data path reporting an operational connection in response to the trace multicast message, wherein the fault is isolated by reference to a last report issued by one of the MIP devices in the data path.

4. The method of claim 1 wherein the HB messages comprise multicast messages.

5. The method of claim 3 wherein an extent of transmission of the trace multicast message is limited by a domain field contained in the trace multicast message, the domain field identifying one or more network domains of the VPLS.

6. The method of claim 1 wherein an extent of transmission of the heartbeat messages is limited by a domain field contained in each of the heartbeat messages, the domain field identifying one or more network domains of the VPLS.

7. Apparatus for implementing a first maintenance end point (MEP) device in a system that provides Virtual Private LAN service (VPLS) to a customer having a first customer edge (CE) device connected to an Ethernet domain through the first MEP device, a second CE device being connected to a second MEP device, with the first and second MEP devices being coupled via a data path that includes a plurality of maintenance intermediate point (MIP) devices, the first MEP device being associated with a service instance of the VPLS, the apparatus comprising:

one or more ports;

a processor operable to broadcast heartbeat (HB) messages via the one or more ports at a periodic interval to a plurality of remote MEPs associated with the service instance, the HB messages being snooped by each of one or more maintenance intermediate point (MIP) devices, MAC address information contained in HB messages being catalogued by the MIP devices in a table that is separate from a transient filtering database, the MAC address information identifying a data path through the one or more MIP devices, the processor being further operable to receive, via the one or more ports, periodic HB messages broadcast at intervals from the remote MEP devices, the processor identifying a fault occurrence when a periodic HB message is not received at one of the intervals from one of the remote MEP devices, in response to the fault occurrence the processor initiating a fault isolation procedure.

8. The apparatus of claim 7 wherein the processor is further operable to isolate the fault by issuing a trace multicast message that traverses the MIP devices in the data path on a hop-by-hop basis, the trace message accessing the catalogued MEP identification information to determine a next hop in the data path, the MIP devices reporting an operational connection in response to the trace multicast message, wherein the fault is isolated by reference to a last report issued by one of the MIP devices in the data path.

* * * * *